Patented Dec. 11, 1945

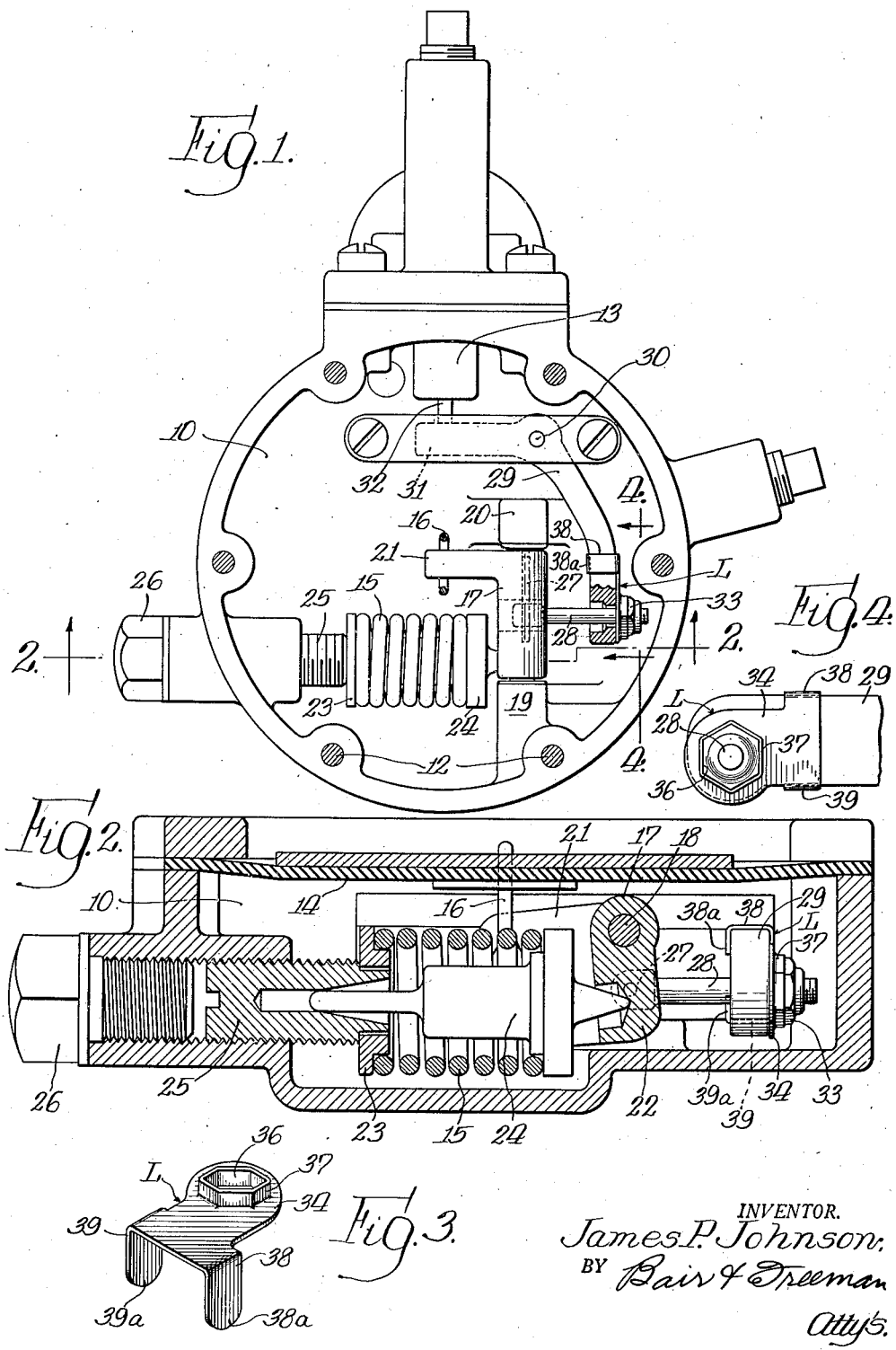

2,390,838

UNITED STATES PATENT OFFICE 2,390,838

ADJUSTABLE NUT LOCK

James P. Johnson, Cleveland, Ohio, assignor to The Aro Equipment Corporation, Bryan, Ohio, a corporation of Ohio Application April 17, 1944, Serial No. 531,373

1 Claim. (Cl. 151—54)

My present invention relates to a nut lock for adjustable nuts and particularly to the adjusting nut for the first pressure reducing stage of an oxygen regulator, the lock being provided for the purpose of preventing rotation of the nut after it is once adjusted, this being of considerable importance to prevent subsequent loss of the adjustment due to vibration or the like.

One object of the invention is to provide a nut lock which is simple to fabricate and inexpensive to manufacture, the device being relatively light and thereby particularly adapted for use in an oxygen regulator used by an aviator in an airplane.

Another object is to provide a nut lock which may be installed merely by placing it on the nut and then bending a pair of fingers of the lock to a retaining position with relation to an arm against which the nut engages.

A more specific object is to provide a nut lock consisting of a sheet metal stamping having an opening formed therein to receive a nut to keep it from turning, and a lateral arm extending from adjacent the opening and terminating in a pair of fingers bent laterally to the plane of the arm and adapted for subsequent bending at their terminal ends to a retaining position.

Still another object is to extrude a flange around the opening to embrace a substantial extent of the thickness of the nut.

With these and other objects in view my invention with respect to its features which I believe to be novel and patentable will be pointed out in the claim appended hereto. For a better detailed understanding of the invention, and further objects relating to details of economy of my invention, reference is made to the following description and to the accompanying drawing wherein such further objects will definitely appear, and in which:

Figure 1 is a plan view of a portion of an oxygen regulator, such portion being the first pressure reducing stage of the regulator and showing therein my nut lock.

Figure 2 is an enlarged sectional view on the line 2—2 of Figure 1 showing an end view of the nut lock in position with relation to an arm and an adjusting nut of the regulator.

Figure 3 is a perspective view of my adjustable nut lock and

Figure 4 is an enlarged view looking in the direction of the arrow 4 of Figure 1.

On the accompanying drawing I have used the reference numeral 10 to indicate a casing of an oxygen regulator. The casing 10 illustrated is for housing the first stage pressure reducing mechanism of the regulator and is usually attached to the rest of the regulator as by screws 12, as shown in the copending application of Arthur H. Tidd and James A. Sneller, Serial No. 569,006, filed December 20, 1944.

The casing 10 has therein a reducing valve 13, controlled by a diaphragm 14 opposed by a range adjusting spring 15. The diaphragm 14 is connected by a link 16 to a bell crank 17, pivoted on a pin 18. The pin 18 is carried by bearings 19 and 20 and has an arm 21 extending to the left in Figures 1 and 2 and an arm 22 extending downwardly in Figure 2. The link 16 is hooked to the arm 21 whereas the spring 15 is interposed between a washer 23 and a stem 24, the stem engaging the arm 22. The stem 24 is slidable in an adjusting screw 25 provided for changing the adjustment of the spring 15. The screw is enclosed by a plug 26.

The bell crank 17 has a pin 27 carried by its arm 22 which is pivoted to an adjusting bolt 28. The bolt 28 extends loosely through an arm 29, pivoted at 30 and constituting a part of a second bell crank, the other arm of which is shown at 31. An adjustable nut 33 is screwed onto the bolt 28 against the arm 29 for adjusting purposes. The arm 31 through a stem 32 operates the pressure reducing valve 13, the valve receiving the relatively high pressure from an oxygen tank. The valve 13 releases oxygen into the casing 10 to act upon the diaphragm 14 and the diaphragm, opposed by the spring 15, regulates the valve 13 so as to maintain a predetermined low pressure of oxygen within the casing 10. This oxygen at low pressure passes into the other part of the regulator as shown in the above mentioned copending application. The parts thus far described form no part of my present invention. They are merely described to show the environment for my adjustable nut lock which will now be described.

The nut lock is indicated generally at L. It comprises a sheet metal stamping having a relatively flat body portion 34, an opening 36 surrounded by an extruded flange 37 and a pair of fingers 38 and 39 extended at right angles from the body portion 34. The nut lock may be made of sheet brass or the like and conveniently cut out and formed in a punch press. The flange 37 is extruded from the body portion 34 to provide the opening 36 with substantial length axially of the nut so that the nut in some instances may leave the arm 29 slightly without assuming a position outside of the opening. The opening of course is of other-than-round shape, preferably the same shape as the perimeter of the nut so as to slidably but non-rotatably receive the nut.

After the nut is adjusted, the nut lock L is placed in position with the fingers 38 and 39 engaging opposite sides of the arm 29 so that the nut is thereby held against loss of its adjustment by subsequent rotation relative to the arm 29, as caused for instance by vibration. To then retain the nut lock L against dislocation from its applied position, the terminal ends of the fingers 38 and 39 are bent over as indicated at 38a and 39a of Figure 2, to partially surround the arm 29. Thus by a simple bending operation the nut lock is retained in position for keeping the nut in its adjusted position yet permitting slight movement of the nut away from the arm 29, as when there is no oxygen under pressure in the casing 10.

From the foregoing it will be observed that I have provided a sheet metal stamping which serves as a nut lock and may be easily installed after an adjustable nut has been turned to its desired adjusted position. The device is simple and light yet effectively prevents any subsequent turning of the nut and consequent loss of adjustment so that it is therefore particularly adapted for the type of installation described. It may be used, however, wherever it is desirable to prevent the rotation of an adjusting nut relative to an arm or other element which may be embraced by the fingers 38 and 39.

Some changes may be made in the construction and arrangement of the parts of my device without departing from the real spirit and purpose of my invention, and it is my intention to cover by my claim any modified forms of structure or use of mechanical equivalents which may be reasonably included within its scope without sacrificing any of the advantages thereof.

I claim as my invention:

A nut lock of the character described for locking a nut from turning relative to a movable arm comprising a stamped sheet metal element having a disk portion provided with an opening therethrough, a flange formed of the sheet metal around said opening, the shape of said opening and flange substantially conforming to the perimeter of a nut, said nut positioned against said arm, said element having a lateral extension from said disk portion extending along and positioned against the top of the arm, and a pair of fingers projecting from opposite sides of the outer end of said lateral extension, said fingers thus being positioned on opposite sides of the arm at such points on said extension that are spaced the greatest distance from the center of the nut and having their terminal ends bent to a retaining position under the bottom of the arm, said flange permitting slight end play of said nut toward and away from said arm without the nut assuming a position beyond the outer end of said flange.

JAMES P. JOHNSON.